(12) United States Patent
Mihara (10) Patent No.: US 11,277,404 B2
(45) Date of Patent: Mar. 15, 2022

(54) SYSTEM AND DATA PROCESSING METHOD (71) Applicant: CANON KABUSHIKI KAISHA, Tokyo (JP)

(72) Inventor: Makoto Mihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 16/541,503

(22) Filed: Aug. 15, 2019

(65) Prior Publication Data

US 2020/0076797 A1 Mar. 5, 2020

(30) Foreign Application Priority Data

Aug. 28, 2018 (JP) .............................. JP2018-159477

(51) Int. Cl.
*H04L 29/06* (2006.01)
(52) U.S. Cl.
CPC ...... *H04L 63/0853* (2013.01); *H04L 63/0876* (2013.01)
(58) Field of Classification Search
CPC ...................................................... H04L 67/28
See application file for complete search history.

(56) References Cited

U.S. PATENT DOCUMENTS

| 8,478,839 B2* | 7/2013 | Mihara | H04N 1/00474 |
| | | | 709/217 |
| 2009/0013397 A1* | 1/2009 | May | H04L 63/10 |
| | | | 726/9 |
| 2012/0100832 A1* | 4/2012 | Mao | H04W 12/069 |
| | | | 455/411 |
| 2012/0233705 A1* | 9/2012 | Boysen | H04L 63/0492 |
| | | | 726/29 |
| 2013/0254672 A1 | 9/2013 | Mihara | |
| 2014/0059213 A1* | 2/2014 | Ollikainen | G06Q 30/0282 |
| | | | 709/224 |
| 2015/0195268 A1* | 7/2015 | Fang | H04L 63/0876 |
| | | | 726/9 |

FOREIGN PATENT DOCUMENTS

JP 2018049667 A 3/2018

* cited by examiner

*Primary Examiner* — Khoi V Le (74) *Attorney, Agent, or Firm* — Venable LLP (57) ABSTRACT

A resource server verifies a first token received from a client terminal, performs processing to provide a second token used to access a stream reception system in accordance with a verification result, and obtains data held by a stream reception system and to perform processing using the data, and the client terminal transmits a request for the second token to the resource server by using the first token, and transmits data to be held by the stream reception system by using the second token obtained as a response to the request, and the client terminal transmits the data by including the first token in the data when the data is to be transmitted, and the resource server specifies the client terminal based on the information associated with the first token included in the data.

9 Claims, 8 Drawing Sheets

| CLIENT ID | PUBLIC KEY | DEVICE SERIAL NUMBER |
|---|---|---|
| client1 | public key1 | 123456789 |
| client2 | public key2 | 987654321 |

FIG. 8B

| CLIENT ID | PRIVATE KEY |
|---|---|
| client1 | privatekey1 |

FIG. 8C

| CLIENT ID | SECRET |
|---|---|
| clientA | secretA |
| clientB | secretB |

FIG. 8D

| CLIENT ID | SECRET |
|---|---|
| clientA | secretA |

FIG. 8E

| ID | RECEPTION DATE AND TIME | HELD DATA |
|---|---|---|
| 1 | 2018/06/25 00:00:00 | ACCESS TOKEN A1 AND DATA |
| 2 | 2018/06/25 00:00:01 | ACCESS TOKEN A1 AND DATA |
| 3 | 2018/06/25 00:00:02 | ACCESS TOKEN A1 AND DATA |
| 4 | 2018/06/25 00:00:10 | ACCESS TOKEN A2, DATA AND IDENTIFICATION INFORMATION |
| 5 | 2018/06/25 00:00:11 | ACCESS TOKEN A2, DATA AND IDENTIFICATION INFORMATION |
| 6 | 2018/06/25 00:00:12 | ACCESS TOKEN A2, DATA AND IDENTIFICATION INFORMATION |

SYSTEM AND DATA PROCESSING METHOD

BACKGROUND OF THE INVENTION

Field of the Invention

The present invention relates to a system and a data processing method.

Description of the Related Art

In recent years, each so-called cloud service has made the API (Application Programming Interface) of its own web service publicly available so that another application can use a function provided by the web service via the API. According to OAuth 2.0 which is an authorization standard usable in the API of a web service, for example, an application B can be authorized to access an API which obtains data managed by a given service A. The application B can use the information used to authenticate itself as the application B to receive a token (to be referred to as an access token hereinafter) used to obtain the access authorization to the API of the service A. Subsequent accesses to the API of the service A can be implemented by using this access token.

Also, in recent years, IoT (Internet of Things), in which many devices are connected to the Internet to perform device control and transmit various kinds of data, has become widespread. Even in an office environment, many devices such as an image forming apparatus and the like have begun to operate and transmit data to a cloud service. An immense amount of traffic that changes every moment is generated in a streaming process in which sets of data are received from many devices in real time in this manner. In general, a server that is to receive such data traffic uses a stream-dedicated data reception service (to be referred to as a stream reception service hereinafter) since a resource server including a conventional API cannot handle such data traffic on its own. An IoT device transmits data to this stream reception service. The stream reception service then buffers the data and supplies the buffered data in response to a data reception request from a resource service.

A stream reception service is an independent service that uses an authentication/authorization platform different from that of a normal resource service. Hence, the resource service cannot identify which client terminal has input the data obtained from the stream reception service. For example, an access token that is used to call the API of the resource service is required to identify a client. By transmitting the access token together with the data to the stream reception service, the resource service can verify the client terminal to which the data obtained from the stream reception service belongs. In this case, the stream reception service buffers the received data, and it takes time for the resource service to obtain the access token. Hence, in some cases, the expiration date of the access token will have already expired by the time the resource service has obtained the access token. For example, Japanese Patent Laid-Open No. 2018-49667 discloses a technique that changes the expiration date of the token in accordance with the resource. However, this will unnecessarily prolong the expiration date and degrade the security of the access token.

SUMMARY OF THE INVENTION

The present invention can specify the transmission source of data when the data is to be obtained via a stream reception service.

According to one aspect of the present invention, there is provided a system that includes a client terminal, an authentication authorization server, a stream reception system, and a resource server, wherein the authentication authorization server includes an issuing unit configured to issue a first token in association with information for identifying the client terminal in response to a request from the client terminal, the resource server includes a verification unit configured to verify the first token received from the client terminal, a providing unit configured to perform processing to provide, to the client terminal, a second token used to access the stream reception system in accordance with a verification result of the verification unit, and a processing unit configured to obtain data held by the stream reception system and to perform processing using the data, and the client terminal includes a requesting unit configured to transmit a request for the second token to the resource server by using the first token, and a transmission unit configured to transmit data to be held by the stream reception system by using the second token obtained as a response to the request of the requesting unit, the transmission unit of the client terminal transmits the data by including the first token in the data when the data is to be transmitted, and when the data is obtained from the stream reception system, the processing unit of the resource server specifies the client terminal, which is the transmission source of the data, based on the information associated with the first token included in the data.

According to another aspect of the present invention, there is provided a system that includes a client terminal, an authentication authorization server, a stream reception system, a resource server, and a transfer server, wherein the authentication authorization server includes an issuing unit configured to issue a first token in association with information for identifying the client terminal in response to a request from the client terminal, the client terminal includes a transmission unit configured to transmit data to be held by the stream reception system to the transfer server by including the first token in the data, the transfer server includes a verification unit configured to verify the first token when the data which includes the first token is received from the client terminal, and a transfer unit configured to transfer the data which includes the first token to the stream reception system in accordance with a verification result of the verification unit, and the resource server includes a processing unit configured to specify, when the data is obtained from the stream reception system, the client terminal which is a transmission source of the data based on the information associated with the first token included in the data.

According to another aspect of the present invention, there is provided a data processing method of a system that includes a client terminal, an authentication authorization server, a stream reception system, and a resource server, comprising: issuing, by the authentication authorization server, a first token in association with information for identifying the client terminal in response to a request from the client terminal; verifying, by the resource server, the first token received from the client terminal; performing processing, by the resource server, to provide, to the client terminal, a second token used to access the stream reception system in accordance with a verification result of the first token; transmitting, by the client terminal, a request for the second token to the resource server by using the first token; transmitting, by the client terminal, the data which includes the first token and is to be held by the stream reception system by using the second token obtained as a response to the request for the second token; obtaining the data held by the stream reception system and performing processing by using the data by the resource server; and specifying, by the resource server, the client terminal which is the transmission source of the data, based on the information associated with the first token included in the data when the data is obtained from the stream reception system.

According to another aspect of the present invention, there is provided a data processing method of a system that includes a client terminal, an authentication authorization server, a stream reception system, a resource server, and a transfer server, comprising: issuing, by the authentication authorization server, a first token in association with information for identifying the client terminal in response to a request from the client terminal; transmitting, by the client terminal, data to be held by the stream reception system by including the first token in the data; verifying, by the transfer server, the first token when the data which includes the first token is received from the client terminal; transmitting, by the transfer server, the data which includes the first token to the stream reception system in accordance with a verification result of the first token; and specifying, by the resource server, the client terminal which is the transmission source of the data, based on the information associated with the first token included in the data when the data is obtained from the stream reception system.

According to the present invention, the transmission source of data can be specified when real-time data reception is to be performed by a stream reception service.

Further features of the present invention will become apparent from the following description of exemplary embodiments (with reference to the attached drawings).

DESCRIPTION OF THE EMBODIMENTS

First Embodiment

An embodiment of the present invention will be described hereinafter with reference to the accompanying drawings. In this embodiment, assume that various kinds of applications (to be described later) are installed in servers on the Internet. Each application provides various kinds of functions (services) in cooperation with a client terminal.

[System Arrangement]

Figure 1:
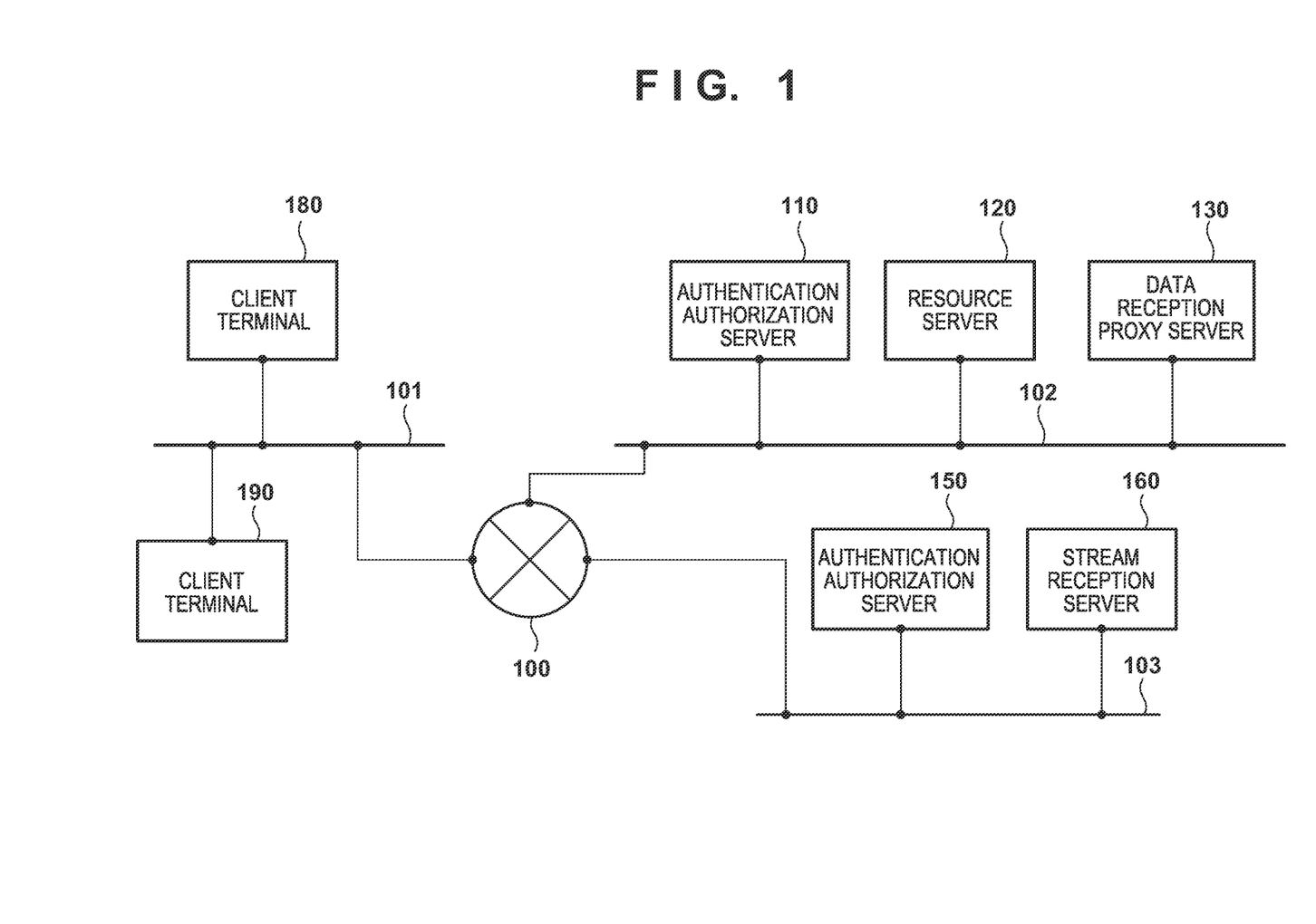
FIG. 1 is a block diagram showing an example of the arrangement of a system according to the embodiment.

A data access management system which serves as an information processing system according to the embodiment is implemented on a network having an arrangement as shown in FIG. 1. A WWW (World Wide Web) system is constructed in a WAN (Wide Area Network) 100 in this embodiment. LANs (Local Area Networks) 101, 102, and 103 are networks that connect the components. In an example of the arrangement shown in FIG. 1, client terminals 180 and 190 belong to the LAN 101. An authentication authorization server 110, a resource server 120, and a data reception proxy server 130 belong to the LAN 102. An authentication authorization server 150 and a stream reception server 160 belong to the LAN 103.

The authentication authorization server 110 is a server that performs authentication/authorization of each client terminal and controls the access to the resource server 120 and the data reception proxy server 130. The resource server 120 provides various kinds of services such as a data backup service for a client terminal, a service for analyzing sensor information obtained by a sensor (not shown) included in the client terminal, and the like. The authentication authorization server 150 is a separate server from the authentication authorization server 110 arranged in the LAN 102, and controls the access to the stream reception server 160. The stream reception server 160 is a server that receives data from the streaming, and receives, for example, streaming data transmitted from the client terminal 180. The stream reception server 160 provides the received data in response to a request from an external apparatus. The stream reception server 160 and the authentication authorization server 150 may be integrally arranged as a stream reception system.

In a case in which the client terminals 180 and 190 cannot directly transmit data to the stream reception server 160, the data reception proxy server 130 serves as a proxy server to act over data reception. The data reception proxy server 130 has a function as a transfer server which transmits (transfers) the received data to the stream reception server 160 once again. States that require the data reception proxy server 130 will be described later. Although only a single apparatus is installed as each server in the arrangement according to this embodiment, each server may be formed by a plurality of apparatuses and may be provided as, for example, an authentication authorization server system. It may be set to perform load distribution or the like by arranging a plurality of servers to provide a single service. In addition, each of the authentication authorization servers 110 and 150 is not limited to controlling access to the server described above, and may be set to control, for example, access to another server arranged in the same LAN.

Each of the client terminals 180 and 190 is a device such as a personal computer, a mobile terminal, an image forming apparatus, or the like for using a service, and corresponds to an IoT device that supports the IoT technique described above. In this embodiment, a case in which the client terminal 180 is a device that has a higher processing speed and communication function performance than the client terminal 190 will be described.

[Apparatus Arrangement]

Figure 2:
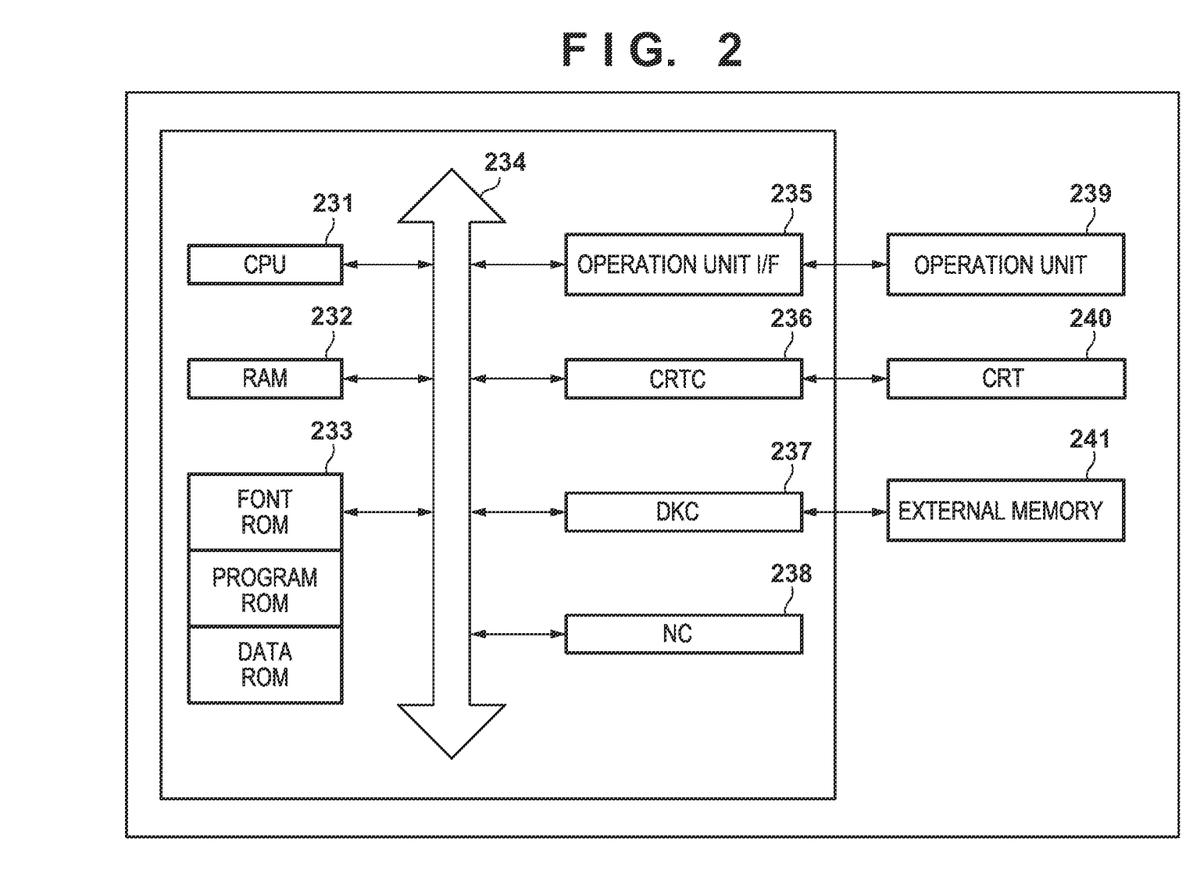
FIG. 2 is a block diagram showing an example of the hardware arrangement of apparatuses according to the embodiment.

FIG. 2 is a view showing an example of a general hardware arrangement of an information processing apparatus that forms each of the servers and client terminals according to this embodiment. Note that the arrangement shown below is merely an example, and each apparatus may have a different arrangement.

A CPU 231 executes a program such as an OS (Operating System), an application, or the like that is stored in a program ROM of a ROM 233 or loaded from an external memory 241 such as a hard disk (HD) to a RAM 232. The CPU 231 also controls each block connected to a system bus 234. The processing of each sequence to be described later can be implemented by executing this program. Note that in the overall description according to the embodiment to be given hereinafter, assume that the CPU 231 is the execution entity on hardware and an application program installed in the external memory 241 is the execution entity on software unless otherwise mentioned.

The RAM 232 is a volatile storage area that functions as the main memory, the work area, and the like of the CPU 231. The ROM 233 is a nonvolatile storage area formed by a font ROM, a program ROM, and a data ROM. An operation unit OF 235 controls inputs from an operation unit 239. A CRT controller (CRTC) 236 controls the display performed on a CRT display 240. A disk controller (DKC) 237 controls the data access to the external memory 241 such as a hard disk (HD) or the like which stores various kinds of data. A network controller (NC) 238 executes communication control processing with a server or another device to which it is connected via the WAN 100 or the LANs 101, 102, and 103. The components are communicably connected to each other via the system bus 234.

[Software Arrangement]

Figure 3:
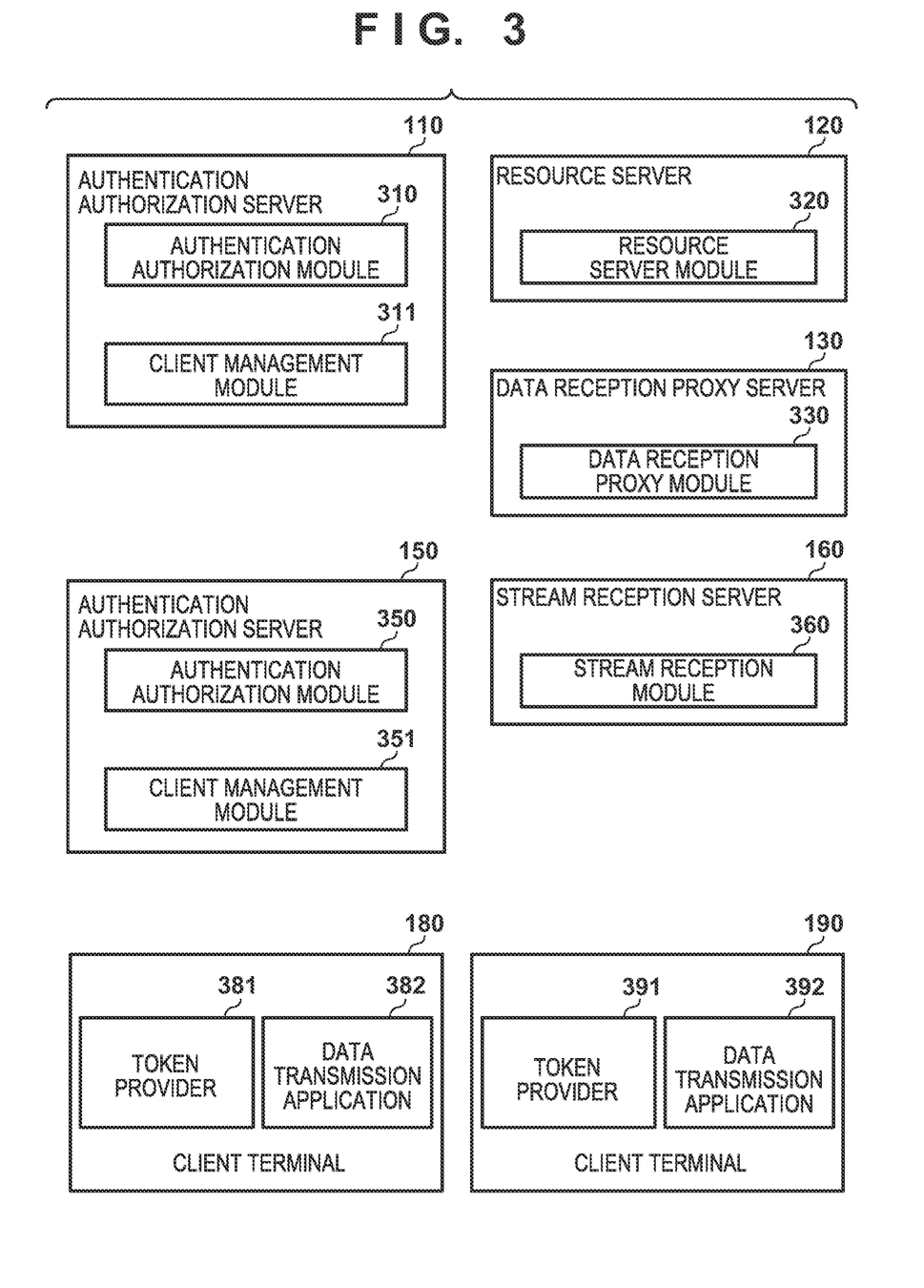
FIG. 3 is a block diagram showing an example of the arrangement of software modules of the apparatuses according to the embodiment.

FIG. 3 is a block diagram showing an example of the arrangement of modules (software) of apparatuses according to the embodiment. A function provided by each apparatus is implemented by executing each corresponding module. Although an arrangement including only the modules related to this embodiment is shown here, other modules may be included. As described above, in this embodiment, an operation is performed when a program corresponding to each module is read out and executed by the CPU of each apparatus.

An authentication authorization server 110 is formed by an authentication authorization module 310 and a client management module 311. The authentication authorization module 310 performs authentication processing of each client terminal and performs authorization processing of each authenticated client terminal. The client management module 311 manages each client and an ID (identification information) and a secret (authentication character string) of the client. Although it is assumed that the client referred here represents a user who is operating a client terminal, the present invention is not limited to this.

The resource server 120 is formed by a resource server module 320. The resource server module 320 receives data from the authentication authorization server 150 and uses the data to implement various kinds of functions such as storing data for each device and the like. In addition, the resource server module 320 publishes a web service as an API, receives a service provision request from the client terminal 180, and provides the service as a response to the request.

The client terminal 180 is formed by a token provider 381 and a data transmission application 382. The token provider 381 transmits a client authentication request and an access token issuance request to the authentication authorization server 110 and obtains the access token from the authentication authorization server 110. The data transmission application 382 uses the service provided by the resource server 120 and transmits the data of the client terminal 180 to the stream reception server 160.

The client terminal 190 is formed by a token provider 391 and a data transmission application 392. The token provider 391 transmits a client authentication request and an access token issuance request to the authentication authorization server 110 and obtains the access token from the authentication authorization server 110. The data transmission application 392 uses the service provided by the resource server 120 and transmits the data of the client terminal 190 to the data reception proxy server 130.

Figure 8A:
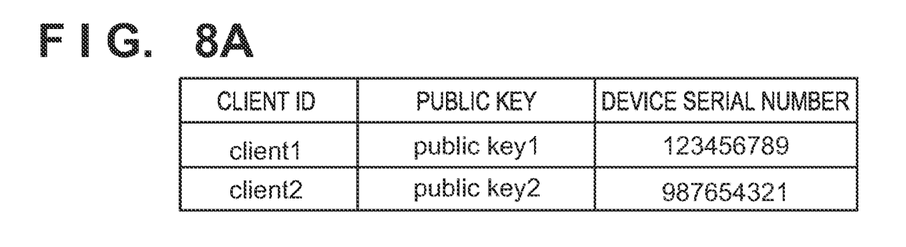
FIGS. 8A to 8E are views each showing an example of the arrangement of a management table according to the embodiment.

As shown in FIG. 8A, the authentication authorization server 110 associates a client ID used to uniquely identify the client, a public key for authenticating the client, and a device serial number (identification information) for uniquely identifying the corresponding client terminal with each other and manages these pieces of associated information. In this case, assume that a client ID "client1" indicates the user of the client terminal 180 and that "123456789" is the device serial number of the client terminal 180. In a similar manner, assume that a client ID "client2" indicates the user of the client terminal 190 and that "987654321" is the device serial number of the client terminal 190. The authentication authorization module 310 can authenticate each client terminal based on the client ID and the public key and specify the device serial number of each client terminal.

Figure 8B:
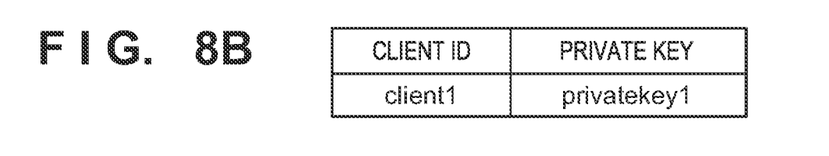

Each of the token provider 381 of the client terminal 180 and the token provider 391 of the client terminal 190 holds the client ID and a private key of the self-terminal as shown in FIG. 8B. FIG. 8A shows the contents of a table held in the client terminal 180. In addition, the public key shown in the first record in the table of FIG. 8A and the private key shown in the table of FIG. 8B are a pair.

Although an authentication operation using a key paired with a client ID is assumed in this embodiment, the authentication method is not particularly limited as previously described, and another method such as authentication by a client ID and a secret may be used. Furthermore, other authentication methods may also be used, and the information to be managed will differ depending on the authentication method.

Additionally, in relation to the registration of the client ID and the private key to each client terminal, a method of dynamically registering the client ID and the private key when the use of the client terminal is started, a method of registering the client ID and the private key in advance, or the like may be employed. For example, when the client ID and the private key are to be registered dynamically, secret information will be held in the client terminal, and a private key that is associated with the client ID is dynamically generated when a request for the secret information is transmitted to the authentication authorization server 110. Each client terminal obtains, as a response, the client ID and the private key generated by the authentication authorization server 110 and manages the obtained client ID and the private key in the client management table.

Figure 8C:
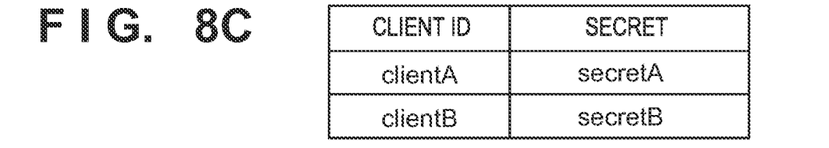

In a similar manner, the authentication authorization server 150 manages the client ID for uniquely identifying each client and the secret needed to authenticate the client as shown in FIG. 8C. An authentication authorization module 350 of the authentication authorization server 150 authenticates a request source based on these pieces of information. In this case, "clientA" is a client ID that indicates the resource server 120. In a similar manner, "clientB" is a client ID that indicates the data reception proxy server 130.

Figure 8D:
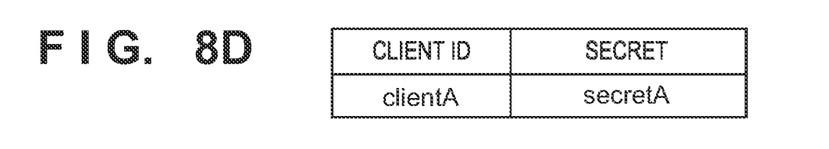

The resource server module 320 of the resource server 120 associates and holds its own client ID and secret as shown in FIG. 8D. Although it is not shown in FIG. 8D, assume that a data reception proxy module 330 of the data reception proxy server 130 also associates and holds its own client ID and secret in a similar manner.

[Processing Sequence]

The procedure of processing in which the client terminal 180 transmits data to the stream reception server 160 and the procedure of data processing in which the resource server 120 obtains and uses the data from the stream reception server 160 will be described with reference to FIGS. 4 to 6.

(Data Transmission)

Figure 4:
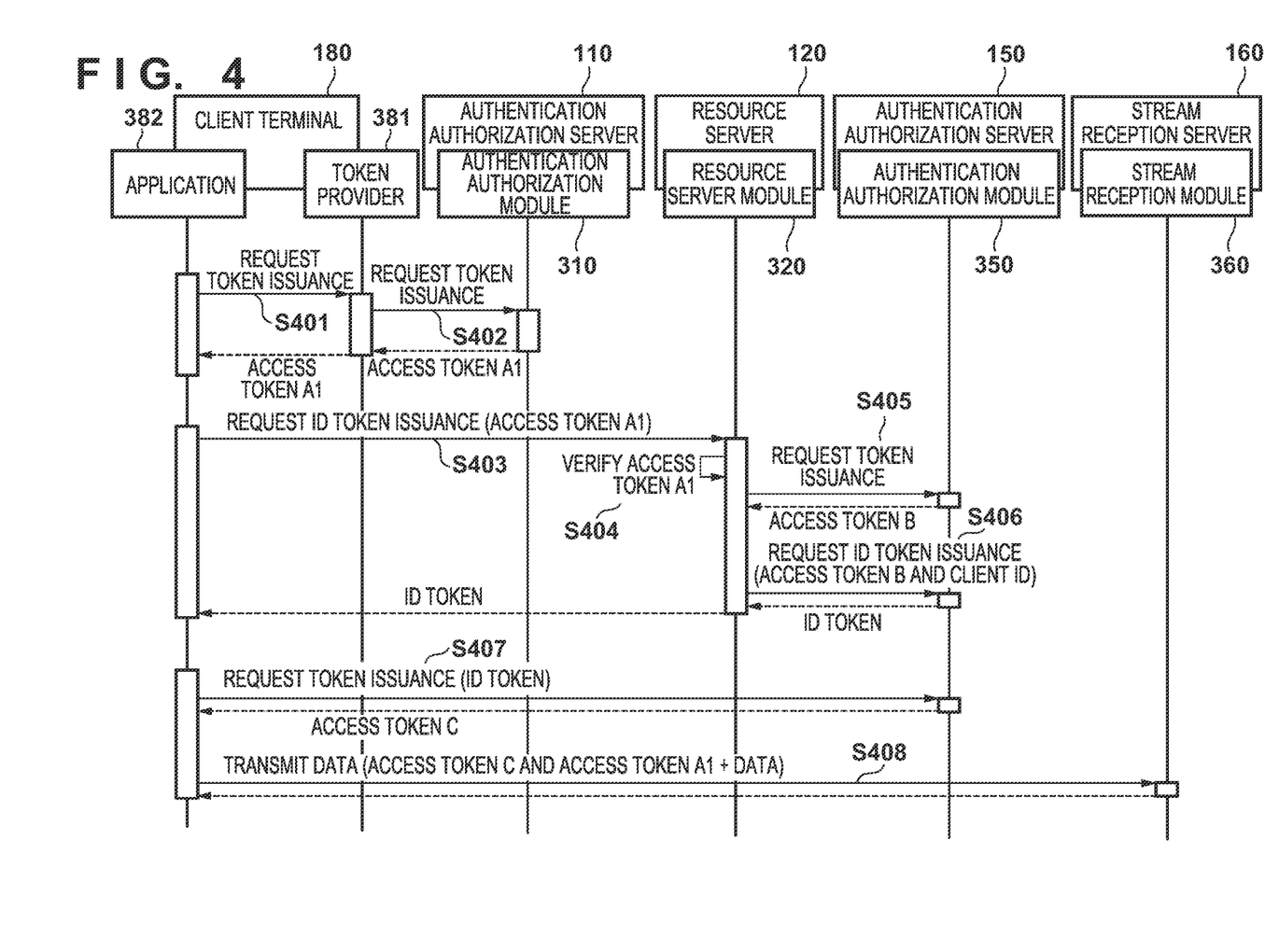
FIG. 4 is a sequence chart of processing to transmit data to a stream reception server according to the embodiment.

FIG. 4 is a sequence chart showing the procedure of processing in which the client terminal 180 transmits data to the stream reception server 160. In FIG. 4, solid lines indicate various kinds of requests, and each broken line indicates a response to each request.

In S401, the data transmission application 382 of the client terminal 180 transmits a token issuance request to the token provider 381.

In S402, the token provider 381 generates an assertion by using the client ID and the private key managed in FIG. 8B and generates a token issuance request together with the assertion. In this embodiment, assume that the assertion will be generated in compliance with the JSON Web Token (JWT) determined in RFC 7519, and that pieces of information such as the client ID and the like are included in JWT. A description of the details of the pieces of information included will be omitted here.

In S402, the token provider 381 makes a token issuance request by transmitting the assertion to the authentication authorization module 310 of the authentication authorization server 110. Upon receiving the token issuance request from the token provider 381, the authentication authorization module 310 obtains, from the client management table (FIG. 8A), the public key corresponding to the client which made the token issuance request, and verifies the signature of the assertion. If the validity of the signature is determined from the verification of the signature, the authentication authorization module 310 issues an access token A1 and transmits the issued access token as a response to the token provider 381. Upon receiving the response, the token provider 381 of the client terminal 180 transmits the access token A1 to the data transmission application 382. The access token A1 that has been generated here is a token used to access the resource server 120 and the data reception proxy server 130 which are under the access control of the authentication authorization server 110. An example of a case in which this token is to be used to access the resource server 120 will be described here. Also, in this embodiment, assume that JWT is used as the access token, and the access token includes pieces of information such as the client ID and the device serial number for the client terminal 180, the expiration date of the token, and the like.

In S403, the data transmission application 382 uses the access token A1 to transmit an ID token issuance request to the resource server module 320 of the resource server 120.

In S404, the resource server module 320 verifies the access token A1 received from the client terminal 180. The resource server module 320 holds the public key issued by the authentication authorization module 310 to verify the JWT, and performs client authorization by verifying the JWT. Although it is not shown in FIG. 4, assume that the public key issued by the authentication authorization module 310 is provided to the resource server 120 before the verification of the JWT and is updated at appropriate timings. In the verification of the JWT, the validity of the signature of the JWT is verified by using the public key, and further verification is performed by determining whether the expiration date of the JWT is valid. In addition, as a result of the verification of the access token A1, it becomes possible to obtain the client information and identify the device serial number of the access source client terminal 180. Note that the verification method is not limited to that described above, and it is possible to employ another arrangement in which the resource server module 320 obtains a verification result and the client information by making a request to the authentication authorization module 310 to verify the access token received from the client terminal. If it is determined that the received access token is a valid token as a result of the verification, the resource server module 320 performs processing of the received request in S405 and S406.

In S405, the resource server module 320 transmits a token issuance request to the authentication authorization module 350 of the authentication authorization server 150. In this token issuance request, a request is transmitted together with the client ID and the secret shown in FIG. 8D. Upon receiving the token issuance request, the authentication authorization module 350 compares the set of the client ID and the secret managed in FIG. 8C with the set of the client ID and the secret included in the request. If it is determined that these sets of information match, the authentication authorization module 350 issues an access token B and transmits the issued access token as a response to the request source resource server 120. The access token B issued here is a token used to access the authentication authorization server 150.

In S406, upon obtaining the access token B, the resource server module 320 transmits an ID token issuance request to the authentication authorization module 350. In the ID token issuance request, the access token B and the client ID of the client terminal 180 obtained from the verification result of S404 are transmitted. The authentication authorization module 350 issues an ID token for the received client ID. The issued ID token is transmitted to the client terminal 180 via the resource server 120.

The ID token is a token used to prove that the client terminal 180 has been definitely authenticated. In this embodiment, the authentication of the client terminal 180 is confirmed when the resource server module 320 verifies the access token A1 in S404. Since the authentication authorization module 350 has established a trusted relationship with the resource server module 320 by providing its own client ID and secret to the resource server module 320, the resource server module 320 trusts the result authenticated by the client terminal 180. The authentication authorization module 350 is configured to issue the ID token based on this trust. In this embodiment, assume that the ID token is in compliance with the JWT format, and that the authentication authorization module 350 can verify the ID token by verifying the signature.

In S407, the data transmission application 382 of the client terminal 180 which received the ID token transmits a token issuance request to the authentication authorization module 350 of the authentication authorization server 150. This token issuance request includes the ID token issued by the authentication authorization server 150. Upon receiving the request, the authentication authorization module 350 verifies the ID token included in the token issuance request. If it is determined from the verification that the ID token is a valid token, the authentication authorization module 350 issues an access token C and transmits the issued access token C as a response to the client terminal 180. The access token C issued here is a token used to access the stream reception server 160 which is under the access control of the authentication authorization server 150.

In S408, the data transmission application 382 of the client terminal 180 which received the access token C transmits data to a stream reception module 360 of the stream reception server 160. In this data transmission, the access token C and the pair of the access token A1 and the data are transmitted. If the stream reception module 360 that received the data transmission request determines that the access token C is a valid token after executing verification, it will hold the pair formed by the access token A1 and the data. As a result, data transmission from the client terminal 180 to the stream reception server 160 is completed.

(Data Transmission at the Time of Use of Data Reception Transmission Server)

On the other hand, the client terminal 180 needs to access not only the authentication authorization server 110 and the resource server 120, but also both the authentication authorization server 150 and the stream reception server 160 in the processing shown in FIG. 4. Hence, the client terminal needs to support a plurality of authentication authorization methods and communication methods, and thus needs to be a high-performance terminal. Therefore, data transmission may not be implemented by the processing of FIG. 4 in some cases if a low-performance client terminal is used.

Figure 5:
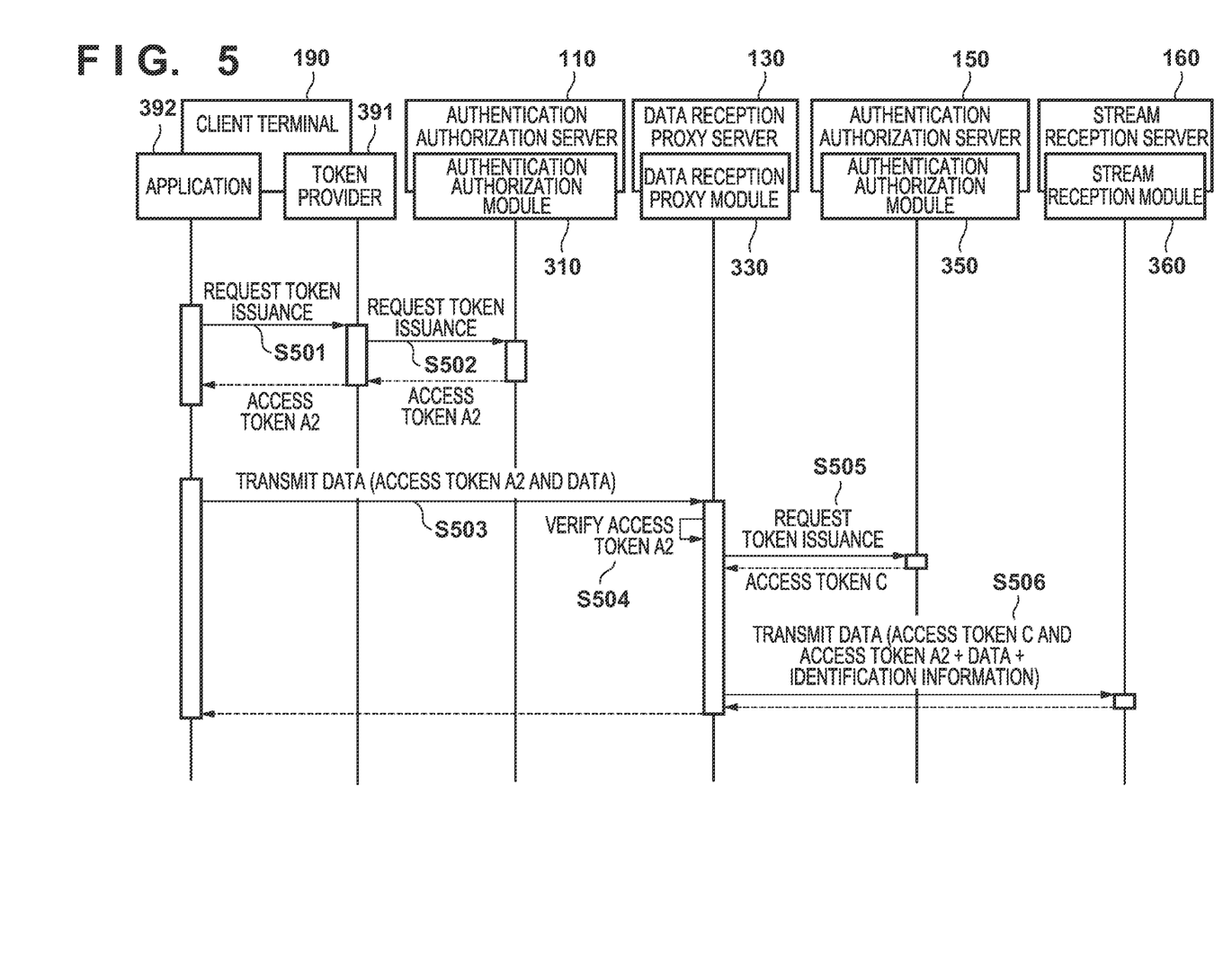
FIG. 5 is a sequence chart of processing to transmit data via a data reception proxy server according to the embodiment.

FIG. 5 is a sequence chart for explaining the procedure of data transmission which is intended to be performed for low-performance client terminal 190. The sequence in this case differs from that of FIG. 4 in the point that the data reception proxy server 130 is used for the data transmission of the low-performance client terminal 190. The data reception proxy server 130 is under the access control of the authentication authorization server 110, and its API is published by using a communication method similar to that of the resource server 120. As a result, the client terminal 190 can implement data transmission by using a method similar to that used when the resource server 120 is to be used.

Note that in this embodiment, a description will be given under the assumption that the data reception proxy server 130 has an arrangement similar to that of the resource server 120 and is not suitable for executing processing to receive a large amount of streaming data. Hence, in a case in which sets of data are to be received from many client terminals, it will be more expensive because more server resources will be required than the stream reception server 160. Therefore, in this embodiment, the processing will be limited to the client terminal 190 which cannot directly transmit data to the stream reception server 160. In addition, the method used to switch between the data transmission by the processing of FIG. 4 and the data transmission by the processing of FIG. 5 is not particularly limited. For example, it may be arranged so that the client terminal side will determine the transmission destination (determine whether to use the data reception proxy server 130). Alternatively, it may be arranged so that the authentication authorization server 110 side will determine the transmission destination in accordance with the performance (specification) of the client terminal.

The processes of S501 and S502 of FIG. 5 are similar to the processes of S401 and S402 of FIG. 4. The client terminal 190 obtains an access token A2 issued by the authentication authorization server 110 as a result of these processes. The access token A2 generated here is a token used to access the resource server 120 and the data reception proxy server 130 which are under the access control of the authentication authorization server 110. An example in which the access token is used to access the data reception proxy server 130 will be described here.

In S503, the data transmission application 392 of the client terminal 190 which received the access token A2 transmits data to the data reception proxy module 330 of the data reception proxy server 130. The access token A2 and the data are transmitted in the data transmission.

In S504, the data reception proxy module 330 performs verification processing of the access token A2 received from the client terminal 190. This process is similar to the process of S404 of FIG. 4. If it is determined that the access token A2 is a valid access token as a result of the verification, the data reception proxy module 330 performs the processes of S505 and S506.

In S505, the data reception proxy module 330 transmits a token issuance request to the authentication authorization module 350 of the authentication authorization server 150. In this token issuance request, a request is transmitted together with the client ID and the secret as shown in FIG. 8D. As described above, the data reception proxy server 130 holds the information of the client ID "clientB" and the corresponding secret "secretB". Upon receiving the token issuance request, the authentication authorization module 350 performs a comparison to determine whether the set of the client ID and the secret managed in FIG. 8C matches the set of the client ID and the secret included in the request. If these sets of information match, the authentication authorization module 350 issues the access token C and transmits the issued access token C to the request source data reception proxy server 130. The access token C issued here is a token used to access the stream reception server 160 which is under the access control of the authentication authorization server 150.

In S506, the data reception proxy module 330 which received the access token C transmits data to the stream reception module 360 of the stream reception server 160. The access token C and the set of access token A2, data, and identification information are transmitted in this data transmission. If it is determined that the access token C is a valid access token after verification, the stream reception module 360 which received the data transmission request will hold the set of the access token A2, the data, and the identification information. The identification information is information used to identify that the data has been registered via the data reception proxy server 130, and is confidential information that can be known only by the resource server 120 and the data reception proxy server 130 which are to use the data. Although the contents of the identification information are not particularly limited, they may include, for example, confidential information that is being managed in common, authentication information, and the like.

The client terminal 190 which is a lower-performance terminal than the client terminal 180 completes data transmission to the stream reception server 160 via the data reception proxy server 130 in the manner described above. According to this sequence, the client terminal 190 can transmit data without directly accessing the authentication authorization server 150 and the stream reception server 160.

Figure 8E:
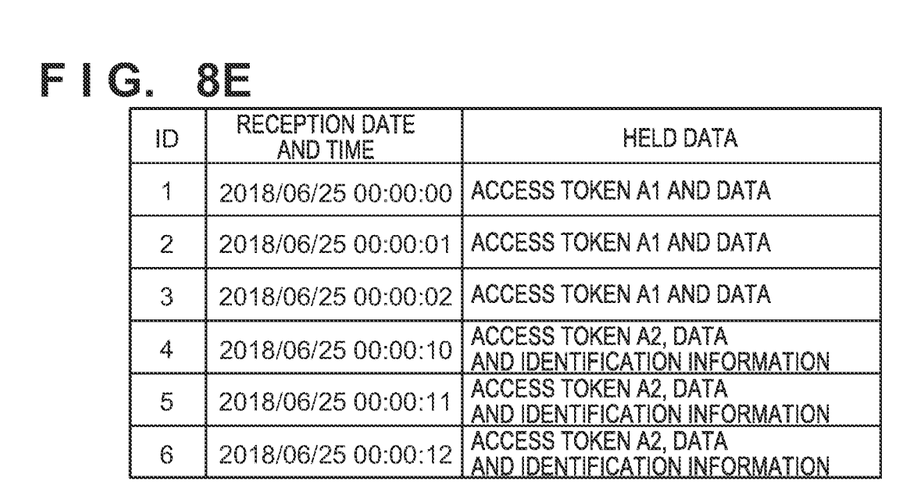

FIG. 8E shows an example of the data held by the stream reception server 160 when the sequence shown in FIG. 4 of FIG. 5 has been completed. The stream reception server 160 associates and holds an ID to uniquely identify each set of data, the reception date and time of each set of data, and the held data. The access token, data, and identification information that were actually transmitted are managed as a single record in the held data. The identification information is held when the processing sequence of FIG. 5 is performed. An ID is issued for each record in the order of the reception date and time, and each record is sorted in accordance with this ID. Also, each record may be automatically deleted after a predetermined time has elapsed since its reception. The length of time until a record is deleted may be preset on the side of the stream reception server 160. Alternatively, each record may be deleted after a predetermined time has elapsed since the record has been provided to the resource server 120.

In FIG. 8E, IDs "1" to "3" indicate sets of data which were transmitted by the client terminal 180 in the processing of FIG. 4. Each set of held data includes the access token A1 and the data received at that time. IDs "4" to "6" indicate sets of data which were transmitted by the client terminal 190 in the processing of FIG. 5. Each set of held data includes the access token A2, the data, and the identification information received at that time.

(Data Processing)

Figure 6:
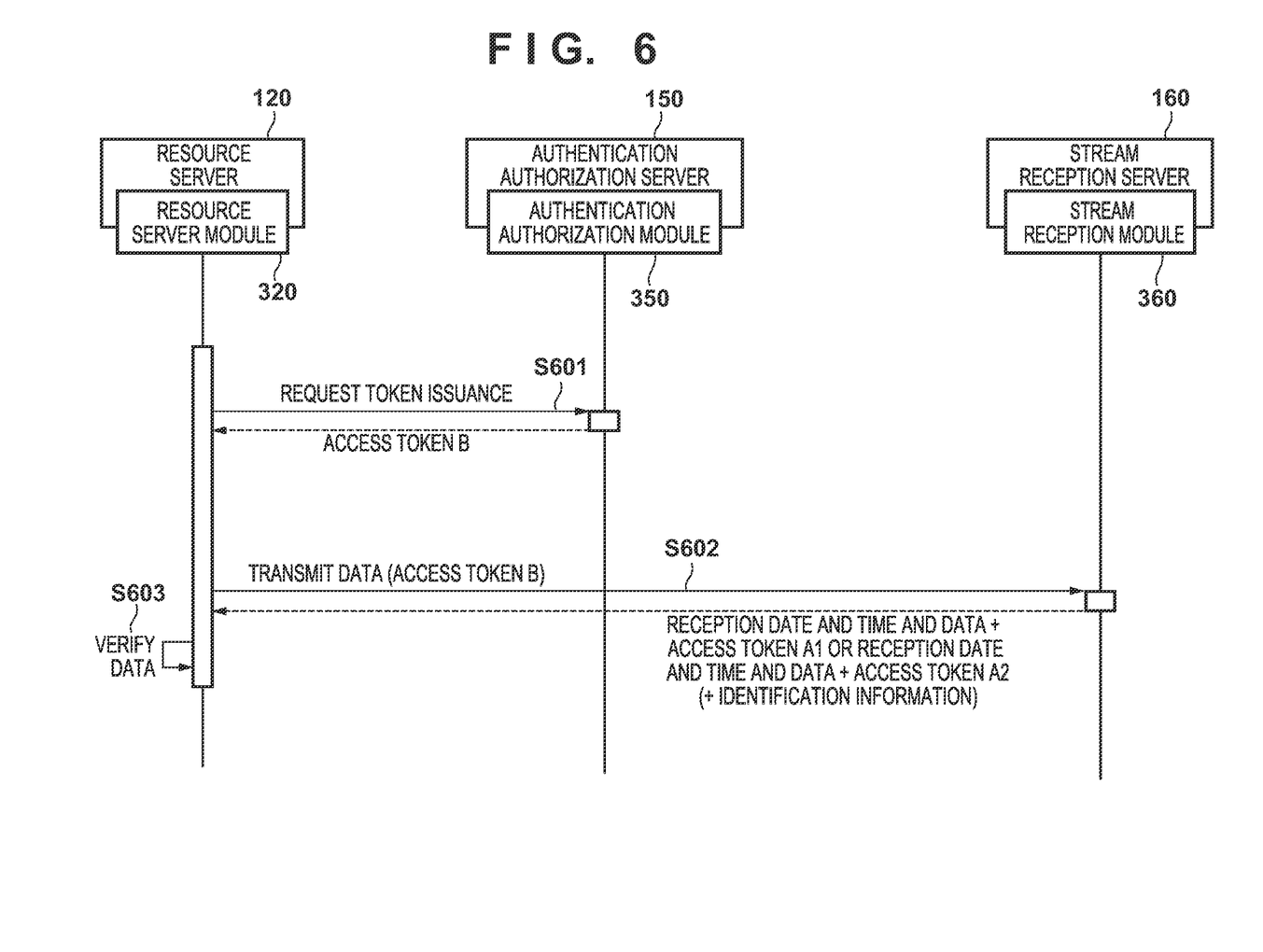
FIG. 6 is a sequence chart of verification processing performed on data obtained from the stream reception server according to the embodiment.

FIG. 6 is a sequence chart of processing in which the resource server 120 obtains data from the data stream reception server 160 and processes the obtained data.

In S601, the resource server module 320 of the resource server 120 transmits a token issuance request to the authentication authorization server 150 and obtains the access token B. This process is similar to the process of S405 in FIG. 4. The resource server 120 obtains the access token B used to access the stream reception server 160 by this process.

In S602, the resource server module 320 which obtained the access token B transmits a data reception request to the stream reception module 360 of the stream reception server 160. The access token B is included in this data reception request. If the access token B is verified and determined to be a valid access token, the stream reception module 360 that received the data reception request will transmit, as a response to the resource server 120, each record managed in the data holding table shown in FIG. 8E in a sequential order from the record with the earliest reception date and time. The response transmitted here includes the held data and the reception date and time.

In S603, the resource server module 320 performs verification of the data received from the stream reception server 160. The detailed procedure of the data verification performed in this process will be described later with reference to FIG. 7. Subsequently, the processing sequence ends.

(Data Verification)

Figure 7:
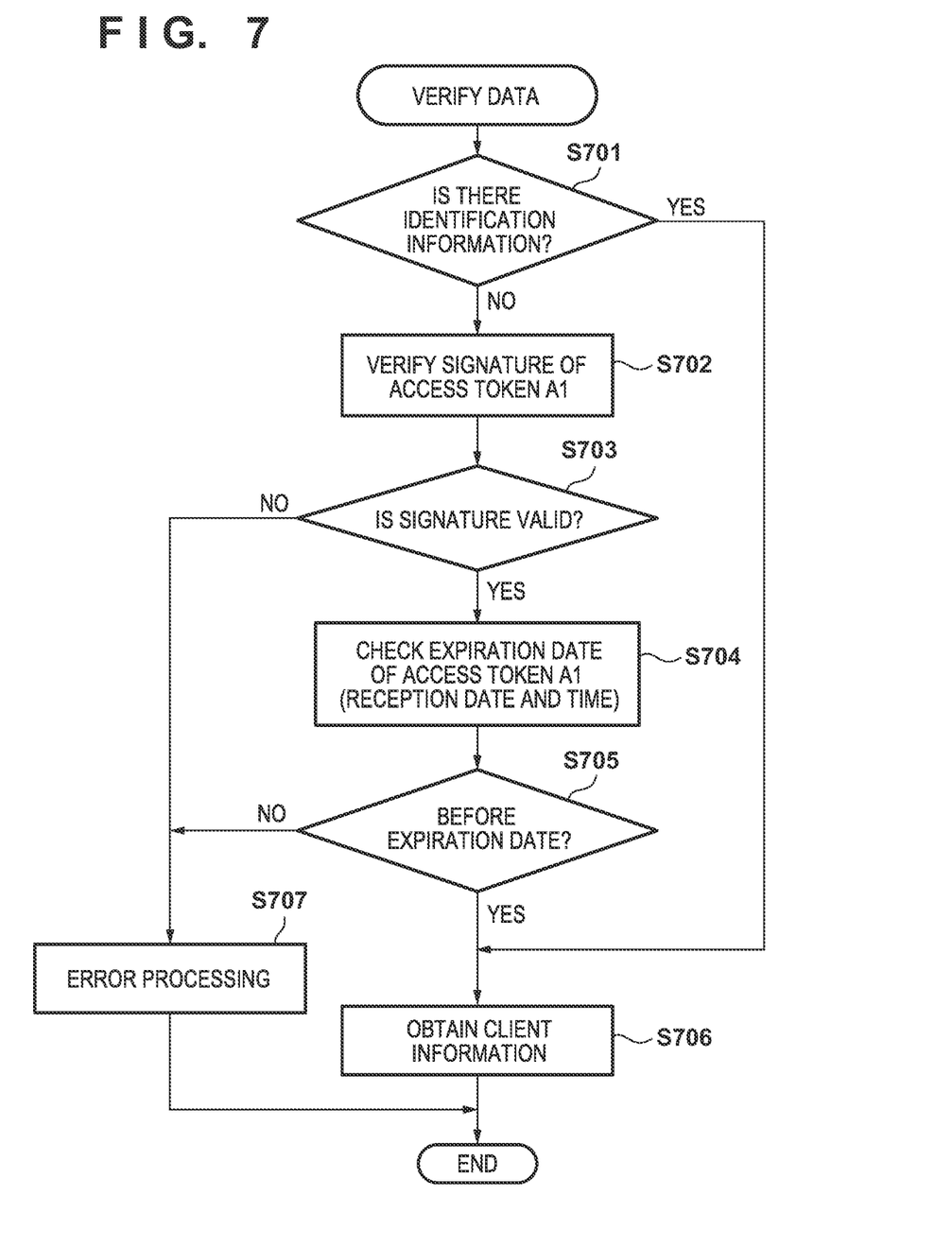
FIG. 7 is a flowchart of the data verification processing according to the embodiment.

FIG. 7 is a flowchart of verification processing performed on the data obtained from the stream reception server 160 by the resource server 120 according to the embodiment. This processing procedure is implemented by the CPU of the resource server 120 reading out and executing a program of the resource server module 320.

In step S701, the resource server module 320 determines whether the obtained data includes the identification information. If it is determined that the identification information is included, the access token verification can be omitted (skipped) since the access token verification has been performed already by the data reception proxy server 130 (S504 of FIG. 5). In other words, the sequence of FIG. 5 has been performed if the identification information is included, and the sequence of FIG. 4 has been performed if the identification information is not included. If it is determined that the identification information is included (YES in step S701), the process advances to step S706. If it is determined that the identification information is not included, (NO in step S701), the process advances to step S702.

In S702, the resource server module 320 verifies the signature of the access token A1. This process is similar to the process of S404 in FIG. 4. Since the sequence of FIG. 4 has been performed already if this process is to be performed, the access token A1 is set as the verification target in this example.

In step S703, as a result of the signature verification performed in step S702, the resource server module 320 determines whether the signature of the access token A1 is a valid signature. If it is determined that the signature is a valid signature (YES in step S703), the process advances to step S704. If it is determined that the signature is not a valid signature (NO in step S703), the process advances to step S707.

In step S704, the resource server module 320 checks the expiration date of the access token A1. At this time, the resource server module 320 determines whether the access token A1 is valid at the point of the reception date and time when the stream reception server 160 received the data. This is because there is a time difference between the point at which the data is received by the stream reception server 160 and the point at which the data is received by the resource server 120. That is, the expiration date is checked based on the information of the "reception date and time" which is held in the management table by the stream reception server 160. If the expiration date is checked by comparing the current time and the expiration date of the access token A1 in a manner similar to that performed in a normal verification, it may cause a state in which the expiration date has expired already at the time of verification of the access token A1 even if the expiration date had been valid at the time of reception.

In step S705, after the check performed in step S704, the resource server module 320 determines whether the access token A1 has not expired. If it is determined that the access token A1 has not expired (YES in step S705), the process advances to step S706. If it is determined that the access token A1 has expired (NO in step S705), the process advances to step S707.

In step S706, the resource server module 320 obtains the device serial number as client information from the access token A1 or the access token A2. In the case of this example, the device serial number of the client terminal 180 is obtained from the access token A1, and the device serial number of the client terminal 190 is obtained from the access token A2. Subsequently, the processing procedure ends.

In step S707, the resource server module 320 performs error processing upon determining that the signature of the access token is invalid or determining that the expiration date has expired. Although the error processing performed here is not particularly limited, processing for, for example, transmitting a notification related to an error or the like will be performed. Subsequently, the processing procedure ends.

As described above, according to this processing procedure, it is possible to specify which device has transmitted the held data together with the access token, and the data can be used in a state in which the data transmission source device has been specified. Note that although it is arranged so the client information will not be obtained (step S706) in a case in which the access token is determined to be invalid, the present invention is not limited to this. For example, it may be arranged so that the client information will be obtained and the obtained client information will be managed and used as the transmission source of an invalid access token even in a case in which the access token is determined to be invalid.

As described above, according to this embodiment, it is possible for the resource server to specify the transmission source of the data that has been transmitted to the stream reception server by the client terminal. It is possible to perform further processing operations based on these pieces of data. In addition, there is no need to set a wastefully long value as the expiration date of the access token.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-159477, filed Aug. 28, 2018, which is hereby incorporated by reference herein in its entirety.

What is claimed is:

1. A system comprises:
a client device, an authentication authorization server, a stream reception system, and a resource server, wherein
the authentication authorization server includes an issuing unit configured to issue a first token in association with information for identifying the client device in response to a request from the client device,
the resource server includes:
a verification unit configured to execute a first verification for verifying the first token received from the client device,
a providing unit configured to perform processing to provide, to the client device, a second token used to access the stream reception system in accordance with a result of the first verification, and
a processing unit configured to obtain data held by the stream reception system and to perform processing using the data, and
the client device includes at least one memory storing instructions and at least one processor that, upon executing the instructions, causes the client device to:
transmit a request for the second token to the resource server by using the first token, and
transmit data to be held by the stream reception system by using the second token obtained as a response to the request, wherein the data transmitted from the client device to the stream reception system includes the first token,
wherein the stream reception system is configured to execute a second verification for verifying the second token and hold the data received from the client device in accordance with a result of the second verification, and
wherein, when the resource server obtains the data is obtained from the stream reception system, the processing unit of the resource server specifies the client device, which is the transmission source of the data, based on the information associated with the first token included in the data.

2. The system according to claim 1, wherein when the data is to be obtained from the stream reception system, the processing unit of the resource server determines whether the first token is valid by obtaining, together with the data, information of a date and time at which the stream reception system started to hold the data and comparing the obtained information of the date and the time with an expiration date of the first token included in the data.

3. The system according to claim 1, further comprising:
a transfer server configured to transfer data to the stream reception system,
wherein the transfer server includes
a second verification unit configured to verify the first token when the data which includes the first token is received from the client terminal, and
a transfer unit configured to transmit the data which includes the first token to the stream reception system in accordance with the verification result of the second verification unit.

4. The system according to claim 3, wherein the transfer unit of the transfer server includes, in the data, identification information which indicates that the data has been transferred via the transfer server when the data is to be transmitted, and
when the identification information is included in the data obtained from the stream reception system, the processing unit of the resource server skips verification processing by determining that verification of the first token included in the data has been performed.

5. A system comprises:
a client device, an authentication authorization server, a stream reception system, a resource server, and a transfer server, wherein
the authentication authorization server includes an issuing unit configured to issue a first token in association with information for identifying the client device in response to a request from the client device,
the client device includes at least one memory storing instructions and at least one processor that, upon executing the instructions, causes the client device to transmit data to be held by the stream reception system to the transfer server by including the first token in the data,
the transfer server includes:
a verification unit configured to execute a first verification for verifying the first token when the data which includes the first token is received from the client device,
a request unit configured to transmit a request for a second token to the resource server, and
a transfer unit configured to transfer, by using the second token obtained as a response to the request, the data which includes the first token to the stream reception system in accordance with a result of the first verification, wherein the stream reception system is configured to execute a second verification for verifying the second token and hold the data received from the transfer server in accordance with a result of the second verification, and wherein the resource server includes a processing unit configured to specify, when the data is obtained from the stream reception system, the client device which is a transmission source of the data based on the information associated with the first token included in the data.

6. The system according to claim 5, wherein when the data is to be obtained from the stream reception system, the processing unit of the resource server determines whether the first token is valid by obtaining, together with the data, information of a date and time at which the stream reception system started to hold the data and comparing the obtained information of the date and the time with an expiration date of the first token included in the data.

7. The system according to claim 5, wherein the transfer unit of the transfer server includes, in the data, identification information which indicates that the data has been transferred via the transfer server when the data is to be transmitted, and when the identification information is included in the data obtained from the stream reception system, the processing unit of the resource server skips verification processing by determining that verification of the first token included in the data has been performed.

8. A data processing method of a system that includes a client device, an authentication authorization server, a stream reception system, and a resource server, the method comprising:

issuing, by the authentication authorization server, a first token in association with information for identifying the client device in response to a request from the client device;

executing a first verification for verifying, by the resource server, the first token received from the client device;

performing processing, by the resource server, to provide, to the client device, a second token used to access the stream reception system in accordance with a verification result of the first verification;

transmitting, by the client device, a request for the second token to the resource server by using the first token;

transmitting, by the client device, the data which includes the first token and is to be held by the stream reception system by using the second token obtained as a response to the request for the second token;

obtaining the data held by the stream reception system and performing processing by using the data by the resource server;

executing, by the stream reception system, a second verification for verifying the second token;

holding, by the stream reception system, the data received from the client device in accordance with a result of the second verification; and specifying, by the resource server, the client device which is the transmission source of the data, based on the information associated with the first token included in the data when the resource server obtains the data from the stream reception system.

9. A data processing method of a system that includes a client device, an authentication authorization server, a stream reception system, a resource server, and a transfer server, comprising:

issuing, by the authentication authorization server, a first token in association with information for identifying the client device in response to a request from the client device;

transmitting, by the client device, data to be held by the stream reception system by including the first token in the data;

executing, by the transfer server, a first verification for verifying, the first token when the data which includes the first token is received from the client device;

transmitting, by the transfer server, a request for a second token to the resource server;

transmitting, by the transfer server, the data which includes the first token to the stream reception system in accordance with a result of the first verification by using the second token obtained as a response to the request;

executing, by the stream reception system, a second verification for verifying the second token;

holding, by the stream reception system, the data received from the transfer server in accordance with a result of the second verification; and specifying, by the resource server, the client device which is the transmission source of the data, based on the information associated with the first token included in the data when the data is obtained from the stream reception system.

* * * * *